Patented May 17, 1932                                        1,859,151

UNITED STATES PATENT OFFICE

WILHELM MOSER, OF RIEHEN, NEAR BASEL, SWITZERLAND, ASSIGNOR TO THE FIRM OF SOCIETY OF CHEMICAL INDUSTRY IN BASLE, OF BASEL, SWITZERLAND

MANUFACTURE OF A DYESTUFF OF THE ANTHRAQUINONE SERIES

No Drawing. Application filed November 28, 1930, Serial No. 498,914, and in Switzerland December 19, 1929.

In U. S. Patent No. 1,044,797 and in British Specifications No. 20,094 of 1908 or No. 11,422 of 1911 there is described the production of a vat-dyestuff dyeing blue-green by sulfurizing 2-methyl-benzanthrone or a derivative thereof. According to the processes disclosed in said specifications the product is obtained in a satisfactory pure condition.

It has now been found that this dyestuff, which corresponds very probably to the formula

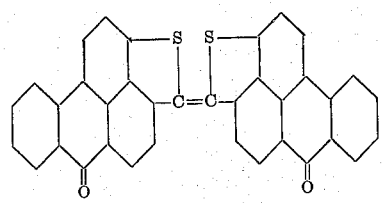

can be converted into an essentially more valuable product of a high degree of purity by treating it with a reducing agent in presence of an alkali and then separating the leuco-compound thus precipitated from the secondary dyestuff that remains in solution. The leuco-compound may directly be used as a commercial product since, when being worked up further (drying or made into a paste), it already oxidizes. It can also be oxidized in a special operation.

The following example illustrates the invention, the parts being by weight:—

Example 20 parts of the dyestuff of the example of British Specification No. 11,422 of 1911 or of U. S. Patent No. 1,044,797 in the form of an aqueous paste, are stirred with 1500 parts of water and 300 parts of caustic soda solution of 30 per cent. strength; there are added 50 parts of sodium hydrosulfite and the whole is heated to 55° C., and kept for ½ hour at 55–60° C. while stirring. The dyestuff at first dissolves to a blue violet solution, whereupon after a short time the leuco-compound of the pure dyestuff begins to separate in a finely granular form. The separation is complete after the aforesaid time whereupon the leuco-compound is filtered hot and washed with a cold aqueous solution of caustic soda solution and sodium hydrosulfite. The pure leuco-compound may be dried, a dark powder with a coppery lustre being obtained, or stirred in boiling water through which air is blown, in which case there is obtained a blue-violet powder with a feeble coppery lustre. Both products dye cotton fast blue-green tints which are essentially more pure and somewhat bluer than those obtainable by means of the parent material.

What I claim is:—

A manufacture of a dyestuff of the anthraquinone series of a high degree of purity by treating the blue-green dyestuff described in Patent No. 1,044,797 and corresponding very probably to the formula

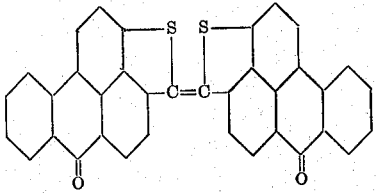

with a reducing agent in presence of an alkali, removing the leuco-compound thus separated from the solution containing the secondary dyestuff.

In witness whereof I have hereunto signed my name this 17th day of November, 1930.

WILHELM MOSER.